(12) United States Patent
Moe

(10) Patent No.: US 11,918,117 B2
(45) Date of Patent: Mar. 5, 2024

(54) CONVERTIBLE CLOSET WITH ARTICULATING TOP SHELF

(71) Applicant: B/E AEROSPACE, INC., Winston Salem, NC (US)

(72) Inventor: Daniel N. Moe, Mukilteo, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 17/747,849

(22) Filed: May 18, 2022

(65) Prior Publication Data

US 2023/0371689 A1  Nov. 23, 2023

(51) Int. Cl.
*A47B 96/02* (2006.01)
*A47B 57/04* (2006.01)
*B64D 11/00* (2006.01)

(52) U.S. Cl.
CPC ............ *A47B 96/025* (2013.01); *A47B 57/04* (2013.01); *B64D 11/003* (2013.01)

(58) Field of Classification Search
CPC ....... A47B 61/06; A47B 96/025; A47B 57/04; A47B 5/04; A47B 5/006; A47B 96/022; D06F 53/04; A47F 5/0043; A47F 5/0081; A47F 5/08; A47F 2005/165; B64D 11/003
USPC ........ 211/1.3, 90.02, 150, 153; 108/42, 152, 108/12, 44; 248/250
See application file for complete search history.

(56) References Cited

U.S. PATENT DOCUMENTS

| | | | | |
|---|---|---|---|---|
| 2,517,385 A | * | 8/1950 | Clark | F25D 25/02 211/90.03 |
| 2,633,998 A | * | 4/1953 | Derman | A47G 25/08 108/29 |
| 3,338,627 A | * | 8/1967 | Frank | A61G 5/1094 108/166 |
| 3,729,160 A | * | 4/1973 | D'Imperio | A01M 31/02 248/217.4 |
| 3,943,859 A | * | 3/1976 | Boone | A47K 10/32 242/598.5 |
| 4,159,071 A | * | 6/1979 | Roca | A47C 7/70 108/42 |
| 4,740,010 A | | 4/1988 | Moskovitz | |

(Continued)

FOREIGN PATENT DOCUMENTS

WO    2021006818    1/2021

OTHER PUBLICATIONS

European Patent Office, European Search Report dated Sep. 21, 2023 in Application No. 23173465.8.

*Primary Examiner* — Jennifer E. Novosad
(74) *Attorney, Agent, or Firm* — SNELL & WILMER L.L.P.

(57) ABSTRACT

An articulating shelf including a first shelf portion having a first edge and an opposing second edge, a first hinge coupled the first edge of the first shelf portion, a second hinge coupled to the second edge of the first shelf portion, a second shelf portion having a first edge and an opposing second edge, the second edge of the second shelf portion coupled to the second hinge, a rod having a first end and an opposing second end, a rod support having a first end and a second send, the first end of the rod support coupled to the second edge of the second shelf portion and the second end of the rod support coupled to the rod between the first and the second ends of the rod, and an end cap including a plunger configured to extend and retract from the end cap.

9 Claims, 10 Drawing Sheets

(56) References Cited

U.S. PATENT DOCUMENTS

| | | | | |
|---|---|---|---|---|
| 4,803,930 A * | 2/1989 | Crocoli | A47B 5/06 | 108/42 |
| 4,995,322 A * | 2/1991 | Frederick | A47B 5/06 | 108/38 |
| 5,143,337 A * | 9/1992 | Tomayko, Jr. | B60N 3/002 | 248/240.4 |
| 5,415,472 A * | 5/1995 | Brise | A47B 96/025 | 211/153 |
| 5,421,646 A * | 6/1995 | McNamara | A47B 96/025 | 211/153 |
| 5,443,018 A * | 8/1995 | Cromwell | B60N 3/004 | 108/44 |
| 5,623,880 A * | 4/1997 | Kuntz | A47K 10/38 | 108/50.17 |
| 5,706,737 A * | 1/1998 | Whitehead | A47B 96/02 | 108/42 |
| 5,918,550 A * | 7/1999 | Weir | A47B 13/16 | 108/157.11 |
| 5,983,912 A * | 11/1999 | Leu | A61H 3/02 | 108/42 |
| 6,109,187 A * | 8/2000 | Cottle | A47B 5/06 | 108/115 |
| 6,334,541 B1 * | 1/2002 | Chang | A47K 10/10 | 248/214 |
| 6,427,606 B1 * | 8/2002 | Klotz | A47K 10/38 | 211/119.003 |
| 6,547,183 B2 | 4/2003 | Farnsworth | | |
| 6,994,031 B2 * | 2/2006 | Huang | A61G 5/1094 | 297/148 |
| 7,073,449 B2 * | 7/2006 | Pipkin | B64D 11/0638 | 108/9 |
| 7,306,282 B2 * | 12/2007 | Salzer | A47C 7/70 | 403/53 |
| 7,395,765 B1 * | 7/2008 | Dorfman | A47B 97/001 | 248/242 |
| 7,645,001 B2 * | 1/2010 | Harris | A47B 96/025 | 312/205 |
| 7,963,231 B2 * | 6/2011 | Osborne | A47B 5/006 | 108/42 |
| 8,051,781 B1 * | 11/2011 | Vind | A47K 3/38 | 211/105.6 |
| 8,997,660 B2 * | 4/2015 | Satterfield | A47B 13/081 | 108/73 |
| 9,415,874 B2 * | 8/2016 | Curtis | A47B 13/088 | |
| 10,104,965 B1 * | 10/2018 | Miller | A47K 10/18 | |
| 10,123,614 B2 * | 11/2018 | Trujillo | A47B 5/00 | |
| 10,271,644 B1 * | 4/2019 | Johnson | A47B 61/02 | |
| 10,287,017 B2 | 5/2019 | Moran et al. | | |
| 10,412,929 B2 * | 9/2019 | Kasper | A01K 5/0114 | |
| 10,905,214 B1 * | 2/2021 | Wieclaw | B65D 85/18 | |
| 10,947,766 B2 * | 3/2021 | Kuyper | E05D 3/186 | |
| 10,973,319 B2 * | 4/2021 | Eames | A47B 51/00 | |
| 11,572,179 B2 * | 2/2023 | Marutzky | B64D 11/0638 | |
| 2006/0000681 A1 * | 1/2006 | Barker | A45C 9/00 | 220/8 |
| 2008/0308512 A1 * | 12/2008 | Knepfle | A47K 10/04 | 248/346.04 |
| 2011/0001415 A1 * | 1/2011 | Park | F25D 25/02 | 211/150 |
| 2018/0360206 A1 * | 12/2018 | Trujillo | F16B 5/0088 | |
| 2019/0308728 A1 | 10/2019 | Mckee | | |
| 2021/0401212 A1 * | 12/2021 | De Loynes | A47K 3/38 | |

* cited by examiner

CONVERTIBLE CLOSET WITH ARTICULATING TOP SHELF

FIELD

The present disclosure generally relates storage in an aircraft, and more specifically to storage within a cabin of the aircraft.

BACKGROUND

Aircraft cabin layouts are regularly reconfigured to address the use cases of different airlines. As an example, aircraft may be reconfigured to accommodate more seating within the cabin or to accommodate larger seats. Often the aircraft reconfiguration results in a loss of stowage space within the cabin of the aircraft. The loss of stowage results in a loss of catering capacity, carry-on luggage capacity, safety equipment storage, and so on.

SUMMARY

An articulating shelf is disclosed herein. The articulating shelf includes a first shelf portion having a first edge and an opposing second edge and a first hinge coupled the first edge of the first shelf portion. The articulating shelf further includes a second hinge coupled to the second edge of the first shelf portion and a second shelf portion having a first edge and an opposing second edge, the second edge of the second shelf portion coupled to the second hinge. The articulating shelf further includes a rod having a first end and an opposing second end, a rod support having a first end and a second send, the first end of the rod support coupled to the second edge of the second shelf portion and the second end of the rod support coupled to the rod at a point between the first end of the rod and the second end of the rod, and an end cap coupled the first end of the rod, the end cap including a plunger configured to extend and retract from the end cap.

In various embodiments, the articulating shelf further includes a support coupled to the first hinge. In various embodiments, the support is a vertical wall. In various embodiments, the first hinge is configured to rotate the first shelf portion from a horizontal position and to a vertical position.

In various embodiments, the articulating shelf further includes a shelf support configured to support the first shelf portion and the second shelf portion. In various embodiments, the first shelf portion includes a recess configured to receive the shelf support. In various embodiments, the second shelf portion includes a recess configured to receive the shelf support. In various embodiments, the plunger is further configured to lock the rod in a position when extended. In various embodiments, the plunger is further configured to release the rod from the position when retracted.

Also disclosed herein is a stowage closet. The stowage closet includes a case having a front panel, a back panel, and a vertical support member extending from the front panel to the back panel. The stowage closet further includes an articulating shelf within the case and extending from the front panel to the back panel. The articulating shelf has a first hinge connected to the vertical support member, a first member having a first edge connected to the first hinge and an opposing second edge, a second hinge connected to the second edge of the first member, a second member having a first edge connected to the second hinge and an opposing second edge, a rod coupled to the second edge of the second member, and an end cap coupled to the rod, the end cap configured to lock the articulating shelf in a position.

In various embodiments, the end cap further includes a plunger configured extend from within the end cap and into a receiver to lock the articulating shelf in the position. In various embodiments, the end cap includes a spring configured to allow the plunger to retract into the end cap and extend out of the end cap, the spring extending the plunger to lock the articulating shelf in place. In various embodiments, the case further includes a first receiver connected to the front panel and configured to receive the plunger to lock the articulating shelf in a lowered position.

In various embodiments, the case further includes a second receiver connected to the front panel and configured to receive the plunger to lock the articulating shelf in a raised position. In various embodiments, the case further includes a shelf support connected to the front panel and configured to support the articulating shelf when in a lowered position. In various embodiments, the first member includes a recess configured to receive the shelf support. In various embodiments, the second member includes a recess configured to receive the shelf support.

Also disclosed herein is an articulating shelf. The articulating shelf includes a first member, a second member, a first hinge having a first edge and a second edge, the first edge coupled to the first member and the second edge coupled to the second member, a second hinge having a first edge, the first edge coupled to the first member opposite the first hinge, and a rod coupled to the second member opposite the first hinge, the rod configured to lock the articulating shelf in a position.

In various embodiments, the articulating shelf further includes an end cap coupled to the rod and a plunger disposed within the end cap, the plunger configured to extend from and retract into the end cap, the plunger locking the articulating shelf in the position when extended. In various embodiments, the articulating shelf further includes a receiver configured to receive the plunger, the receiver locking the articulating shelf in the position.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
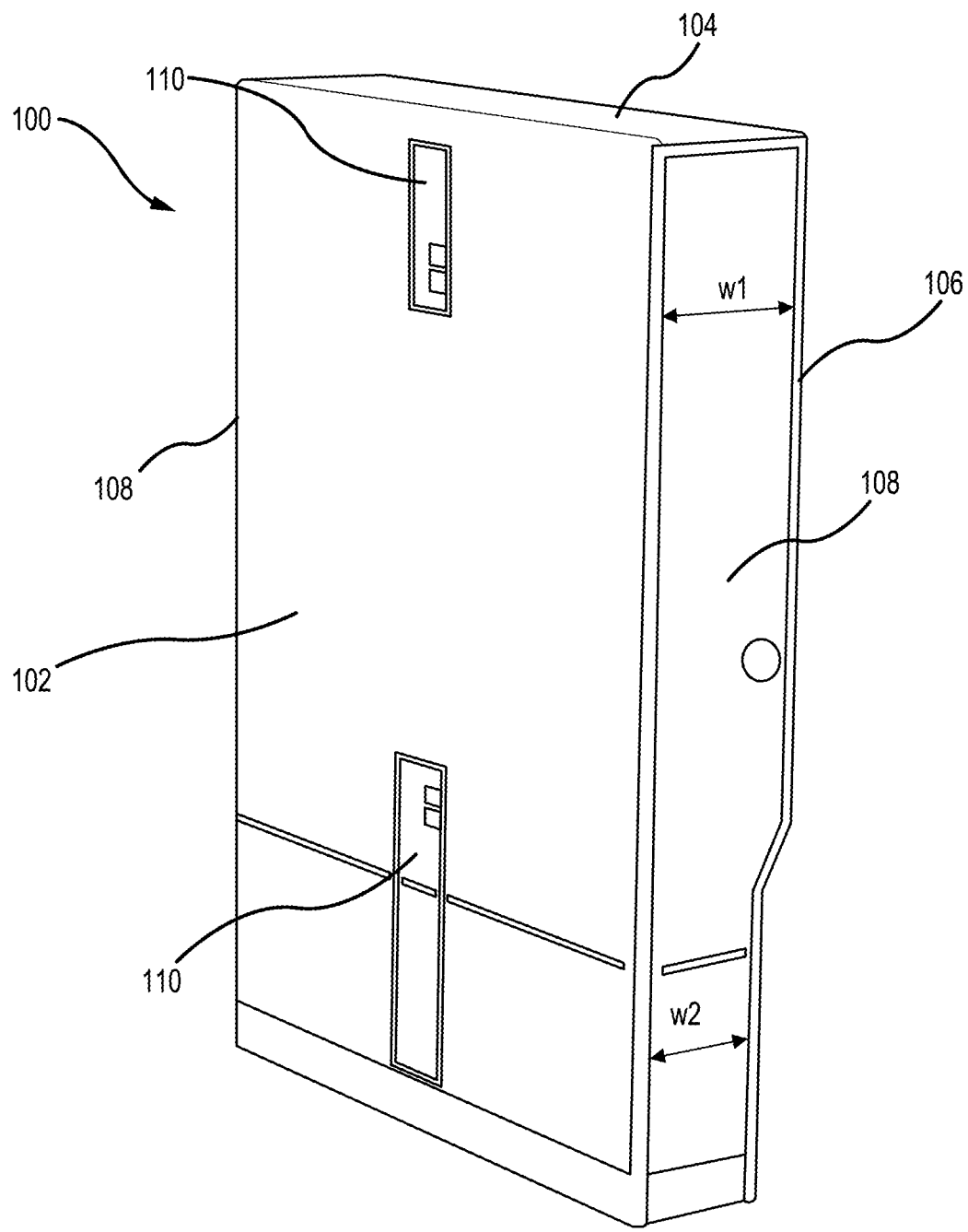
FIGS. 1A and 1B illustrate an exemplary stowage closet, in accordance with various embodiments.
Figure 1B:
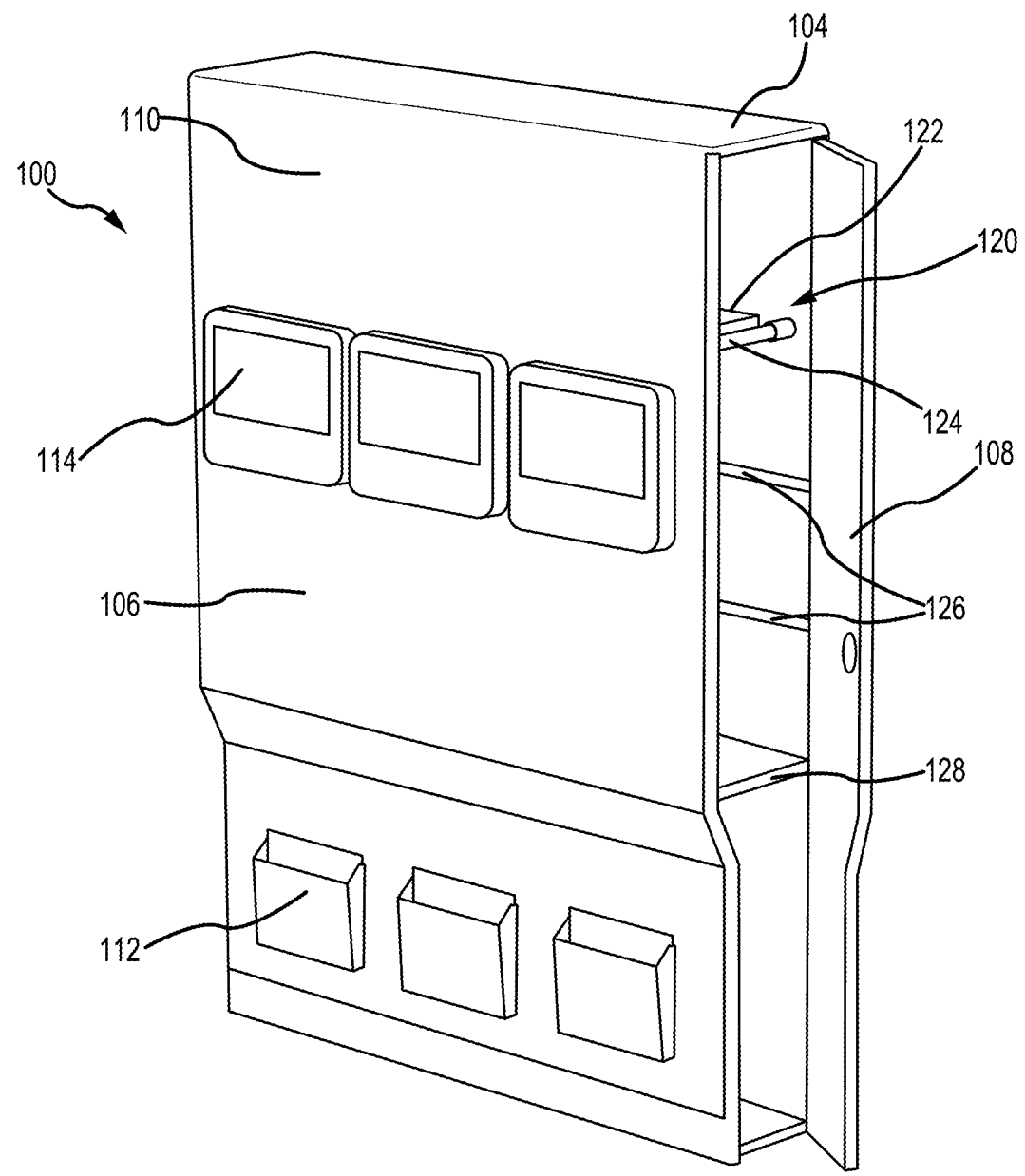

Referring to FIGS. 1A and 1B, in accordance with various embodiments, a stowage closet 100 is illustrated. The stowage closet 100 has a front panel 102, a top panel 104, a back panel 106, and doors 108 on either side of stowage closet 100. The front panel 102, the top panel 104, and the back panel 106 forming a case. Stowage closet 100 may replace a conventional flat partition wall in an aircraft, such as a class divider, for example. In various embodiments, stowage closet 100 may be center mounted in a twin aisle airplane so that each door 108 is accessible from an aisle of the aircraft. In various embodiments, one of the doors 108 may instead be a fixed side panel such that stowage closet 100 is accessible from a single side or single aisle of an aircraft. Such embodiments may be suitable for smaller, narrow body aircraft. In various embodiments, stowage closet 400 may be placed at any FAA-mandated cross-aisle and/or near any entrance doorway.

Top panel 104, front panel 102, back panel 106, and doors 108 are made, in various embodiments, using a honeycomb panel having a sufficient strength to thickness ratio for stowage closet 100. The honeycomb panel may be about 0.25 inches (0.64 cm) to about 2.0 inches (5.08 cm) thick, more specifically, about 0.5 inches (1.27 cm) to about 1.5 inches (3.81 cm) thick, and more specifically about 1 inch (2.54 cm) thick. Stowage closet 100 has a top width w1 and a bottom width w2. In various embodiments, bottom width w2 is smaller than top width w1 to provide leg space for passengers facing stowage closet 100. Top width w1 may be about 10 inches to about 15 inches. In various embodiments, the top width w1 may be about 12 inches. Bottom width w2 may be about 8 inches to about 15 inches. In various embodiments, bottom width w2 may be about 9 inches to about 12 inches. In various embodiments, bottom width w2 may be about 10 inches. The widths w1 and w2 of stowage closet 100 may be adjusted to suit different aircraft layouts.

Front panel 102 may include one or more compartments 110. In various embodiments, compartments 110 may store emergency equipment. Some examples of emergency equipment include fire extinguishers, first aid kits, automatic external defibrillator (AED), among others. Back panel 106 may include one or more entertainment units 114 and/or one or more magazine compartments 112. Stowage closet 100 further includes an articulating shelf system 120 including an articulating shelf, or shelf, 122 and a rod 124, support rails 126, and a fixed shelf 128. Articulating shelf system 120, support rails 126, and fixed shelf 128 provide various stowage configurations to suit different configurations of an aircraft or a particular flight. In various embodiments, fixed shelf 128 may be hinged and/or removable.

Referring to FIGS. 2A-2D, in accordance with various embodiments, various stowage configurations of stowage closet 100 are illustrated. The examples illustrated in FIGS. 2A-2D are not intended to be limiting but are intended to be exemplary configurations for discussion purposes. FIGS. 2A-2D illustrates stowage closet 100 storing containing exemplary carry-on luggage 130, clothing 132, catering standard units (SUs) 134, and safety equipment 136. Carry-on luggage 130 may be standard sized roller bags, duffle bags, boxes, among others. Clothing 132 may be hanging garment bags, jackets, coats, or any other item that may hang from a shelf rod such as rod 124. SUs 134 may be boxes or containers that are standardized in size and used by aircraft personnel during a flight, such as catering. Each SU 134 may be about 11 inches wide, about 11.5 inches tall, and about 14 inches to about 16 inches long. Carry-on luggage 130, clothing 132, and SUs 134 may be accessible via doors 108 of stowage closet 100. Safety equipment 136 may be accessible via compartments 110 of stowage closet 100. In various embodiments, half size trolley carts may be stored in stowage closet 100. Half size carts may be about 11.85 inches wide, 40.55 inches tall, and about 15.94 inches long. Fixed shelf 128 may be raised or removed to store a half sized cart.

Figure 2A:
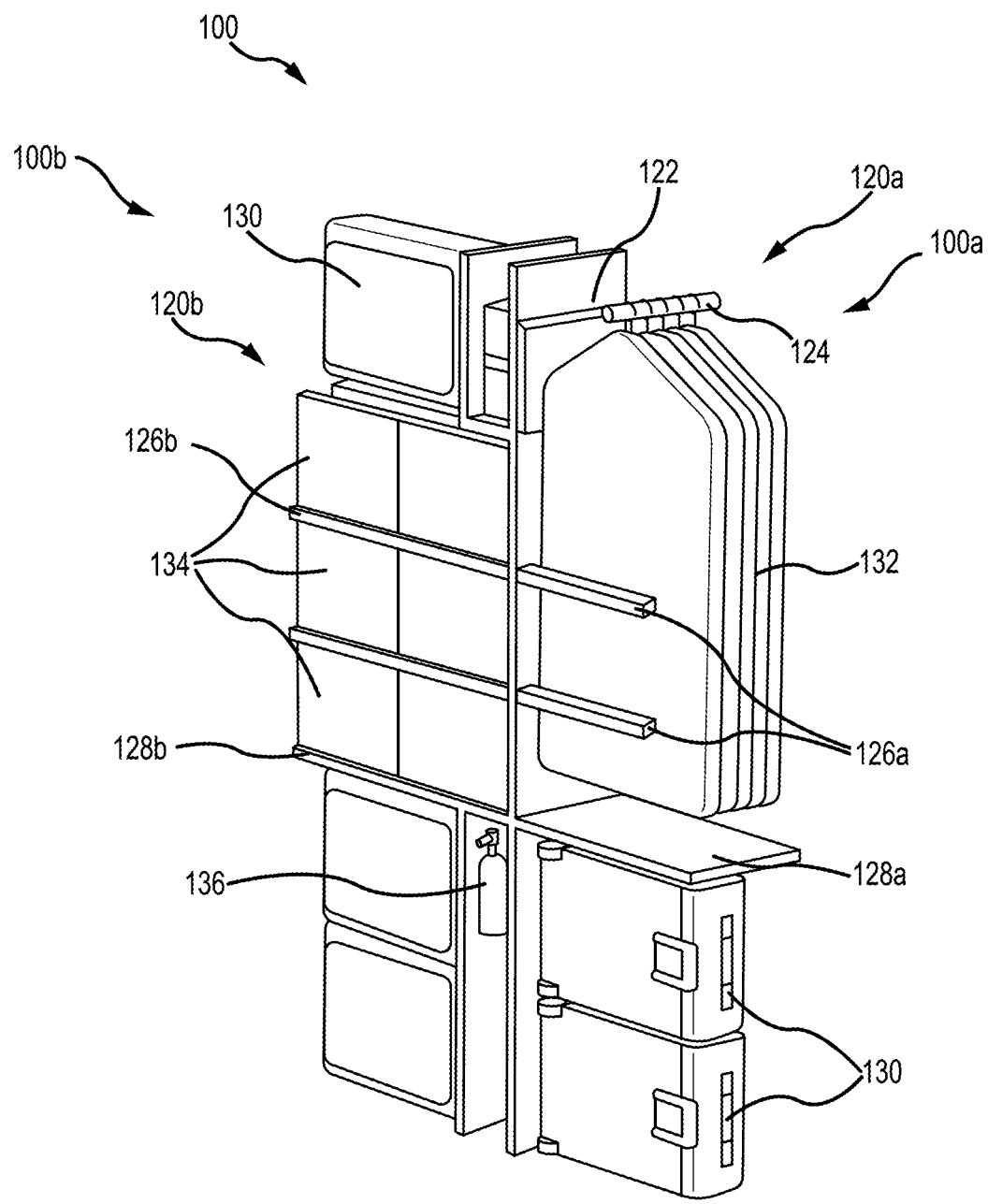
FIGS. 2A, 2B, 2C, and 2D illustrate different configurations of the stowage closet in FIGS. 1A and 1B, in accordance with various embodiments.

As depicted in FIG. 2A, stowage closet 100 is divided into a first side 100a and a second side 100b. Side 100a includes an articulating shelf system 120a, support rails 126a and a fixed shelf 128a. Side 100b includes an articulating shelf system 120b, support rails 126b, and a fixed shelf 128b. Articulating shelf system 120a is configured in a raised position such that rod 124 is able to support clothing 132. Clothing 132 hangs below articulating shelf system 120a and between support rails 126a. Carry-on luggage 130 is stored below fixed shelf 128a. Articulating shelf system 120b is configured in a lowered position with carry-on luggage 130 stored thereon. SUs 134 are stored below articulating shelf system 120a with support rails 126b and fixed shelf 128b supporting various SUs 134. Additional carry-on luggage 130 is stored below fixed shelf 128b. In this configuration, stowage closet 100 is depicted as storing five pieces of carry-on luggage 130, six SUs 134, and a number of items of clothing 132.

Figure 2B:
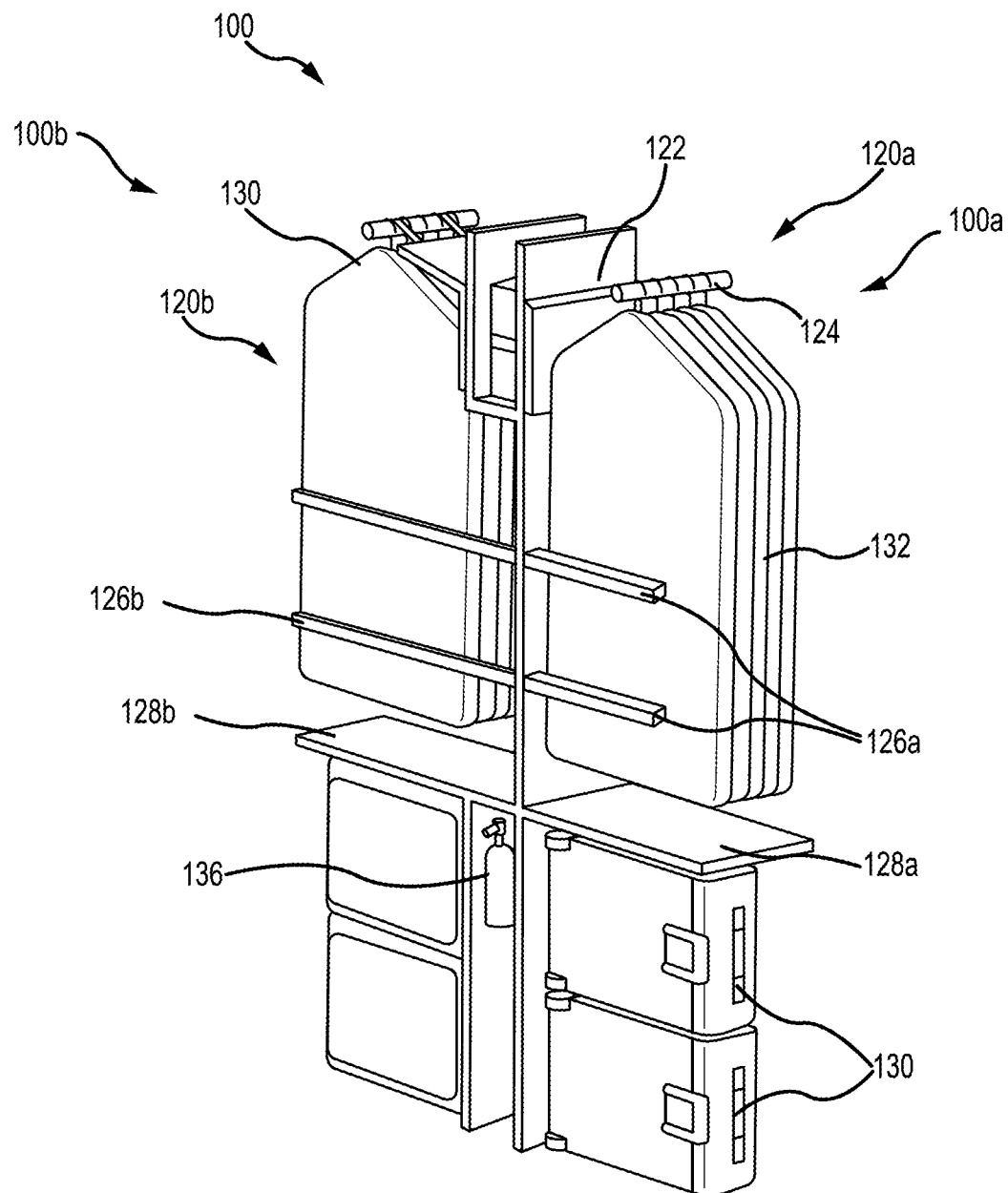

As depicted in FIG. 2B, stowage closet 100 is again divided into first side 100a and second side 100b. Side 100a includes an articulating shelf system 120a, support rails 126a and a fixed shelf 128a. Side 100b includes an articulating shelf system 120b, support rails 126b, and a fixed shelf 128b. Articulating shelf systems 120a and 120b are both configured in a raised position such that rod 124 is able to support clothing 132. On side 100a, clothing 132 hangs below articulating shelf system 120a and between support rails 126a. On side 100b, clothing 132 hangs below articulating shelf system 120b and between support rails 126b. Carry-on luggage is stored below both fixed shelves 128a and 128b. In this configuration, stowage closet 100 is depicted as storing four pieces of carry-on luggage 130 and a number of items of clothing 132.

Figure 2C:
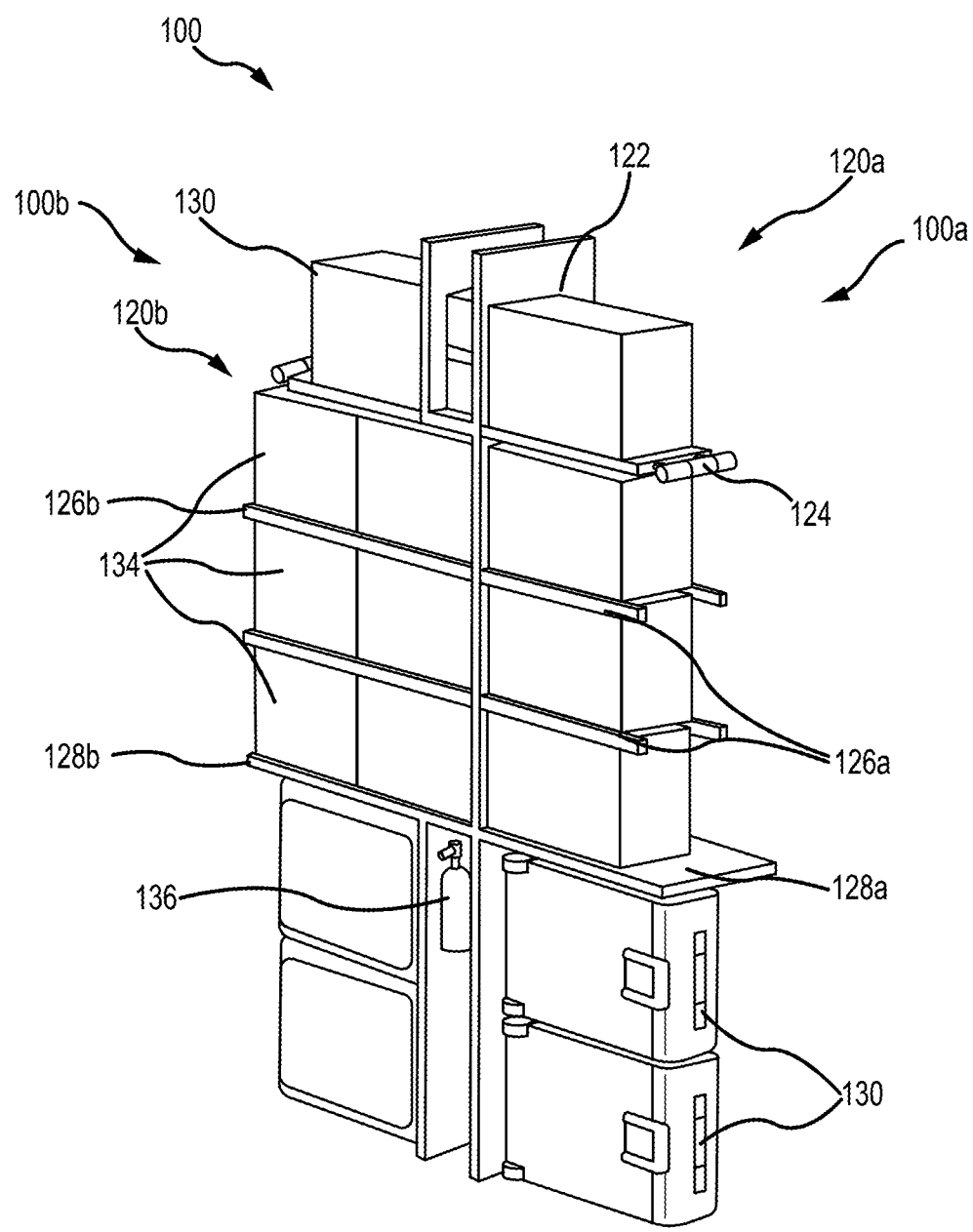

As depicted in FIG. 2C, stowage closet 100 is divided into first side 100a and second side 100b. Side 100a includes an articulating shelf system 20a, support rails 126a and a fixed shelf 128a. Side 100b includes an articulating shelf system 120b, support rails 126b, and a fixed shelf 128b. Articulating shelf systems 120a and 120b are both configured in a lowered position such that articulating shelf systems 120a and 120b are able to support one or more SUs 134. On side 100a, a single SU 134 is stored on articulating shelf system 120a. Multiple SUs 134 are stored below articulating shelf system 120a on support rails 126a and fixed shelf 128a. Carry-on luggage 130 is stored below fixed shelf 128a. On side 100b, multiple SUs 134 are stored on articulating shelf system 120b. Multiple SUs 134 are stored below articulating shelf system 120b on support rails 126b and fixed shelf 128b. Carry-on luggage 130 is stored below fixed shelf 128b. In this configuration, stowage closet 100 is depicted as storing four pieces of carry-on luggage 130 and eleven SUs 134.

Figure 2D:
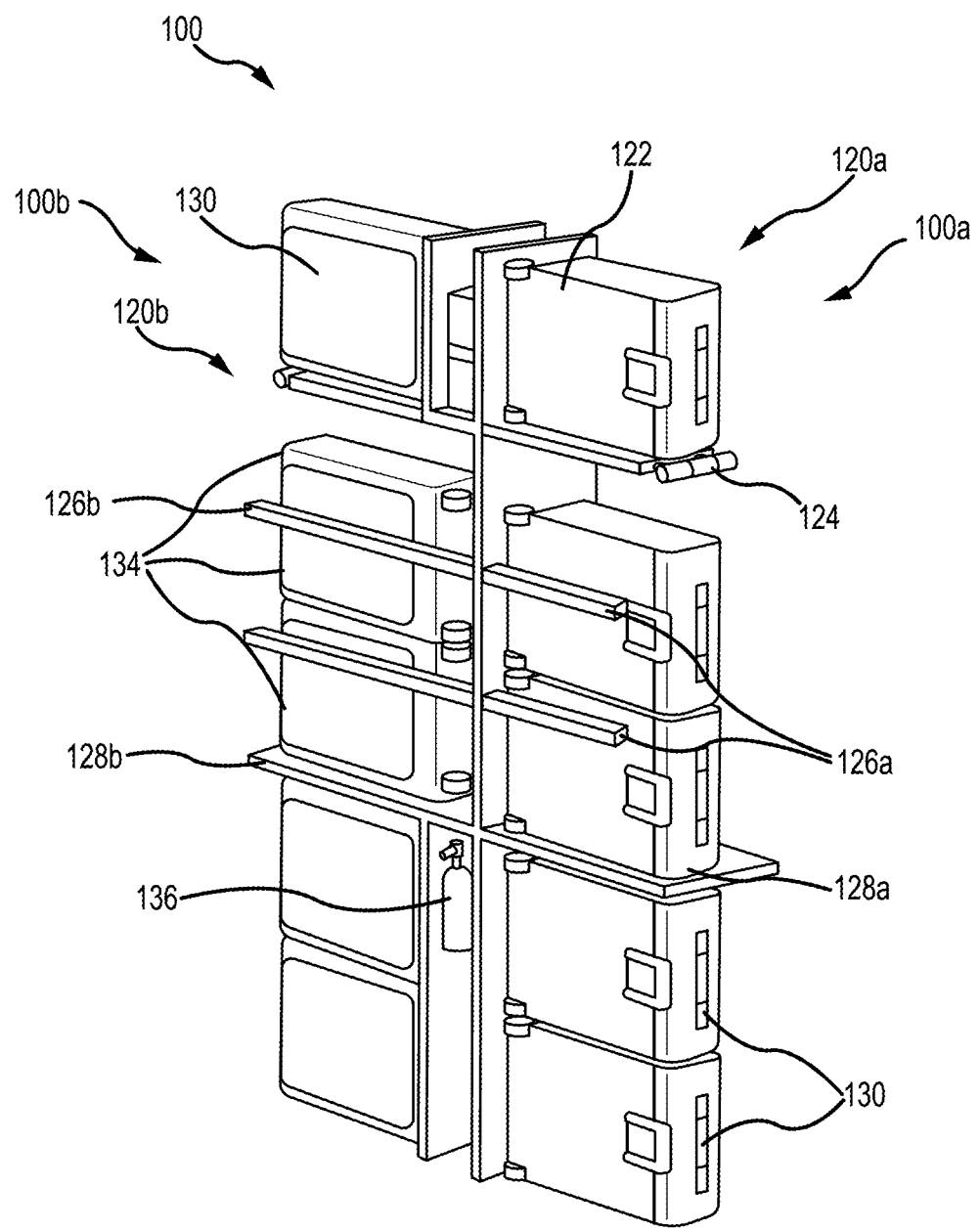

As depicted in FIG. 2D, stowage closet 100 is again divided into first side 100a and second side 100b. Side 100a includes an articulating shelf system 120a, support rails 126a and a fixed shelf 128a. Side 100b includes an articulating shelf system 120b, support rails 126b, and a fixed shelf 128b. Articulating shelf systems 120a and 120b are both configured in a lowered position such that articulating shelf systems 120a and 120b are able to support one or more carry-on luggage 130. On side 100a, a single piece of carry-on luggage 130 is stored on articulating shelf system 120a. Multiple pieces of carry-on luggage 130 are below articulating shelf system 120a, between support rails 126a, and on fixed shelf 128a. Multiple pieces of carry-on luggage 130 are stored below fixed shelf 128a. On side 100b, a single piece of carry-on luggage 130 is stored on articulating shelf system 120b. Multiple pieces of carry-on luggage 130 are below articulating shelf system 120b, between support rails 126b, and on fixed shelf 128b. Multiple pieces of carry-on luggage 130 are stored below fixed shelf 128b. In this configuration, stowage closet 100 is depicted storing ten pieces of carry-on luggage 130.

Figure 3A:
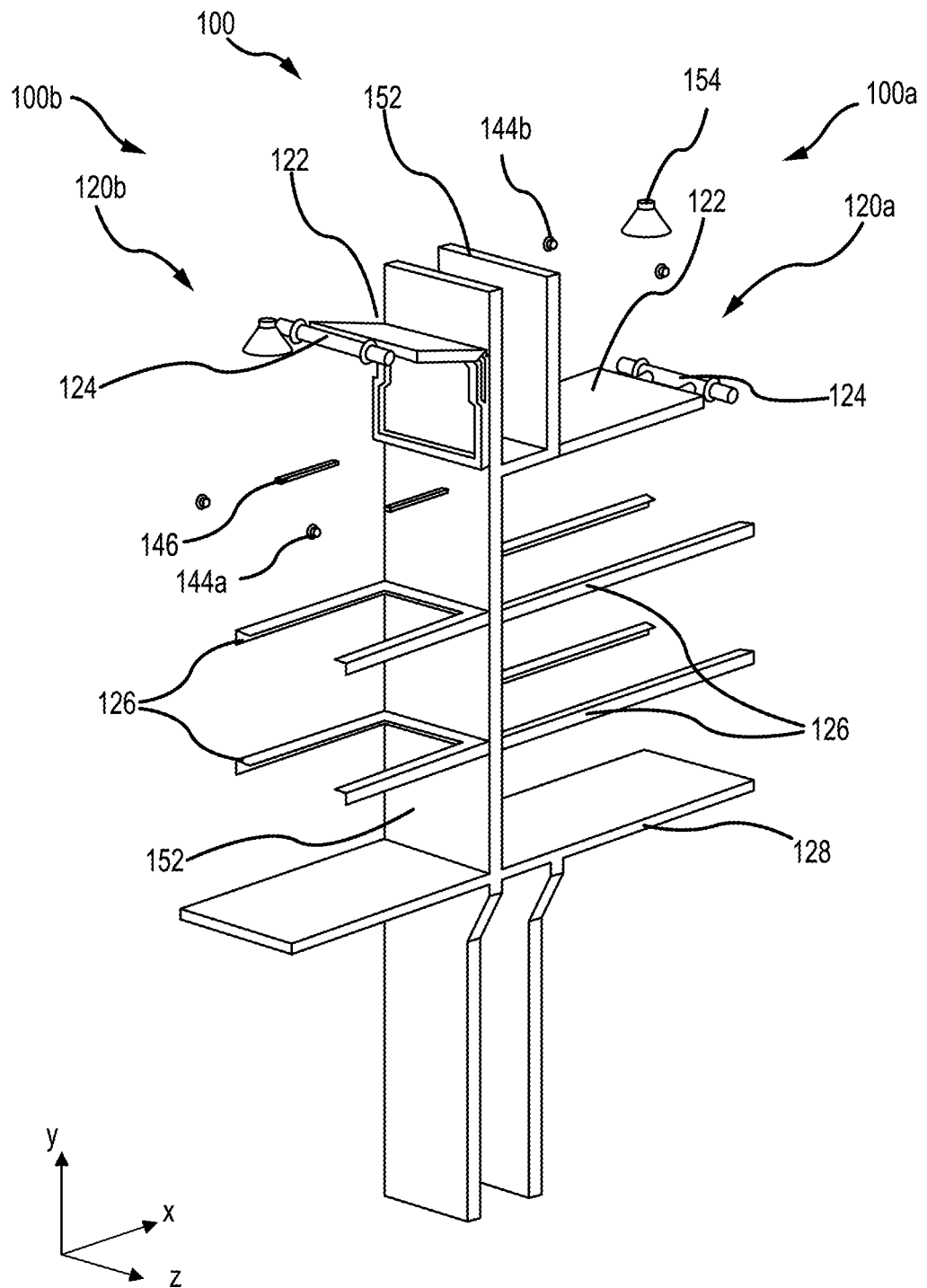
FIGS. 3A, 3B, and 3C illustrate the components of an exemplary stowage closet, in accordance with various embodiments.
Figure 3C:
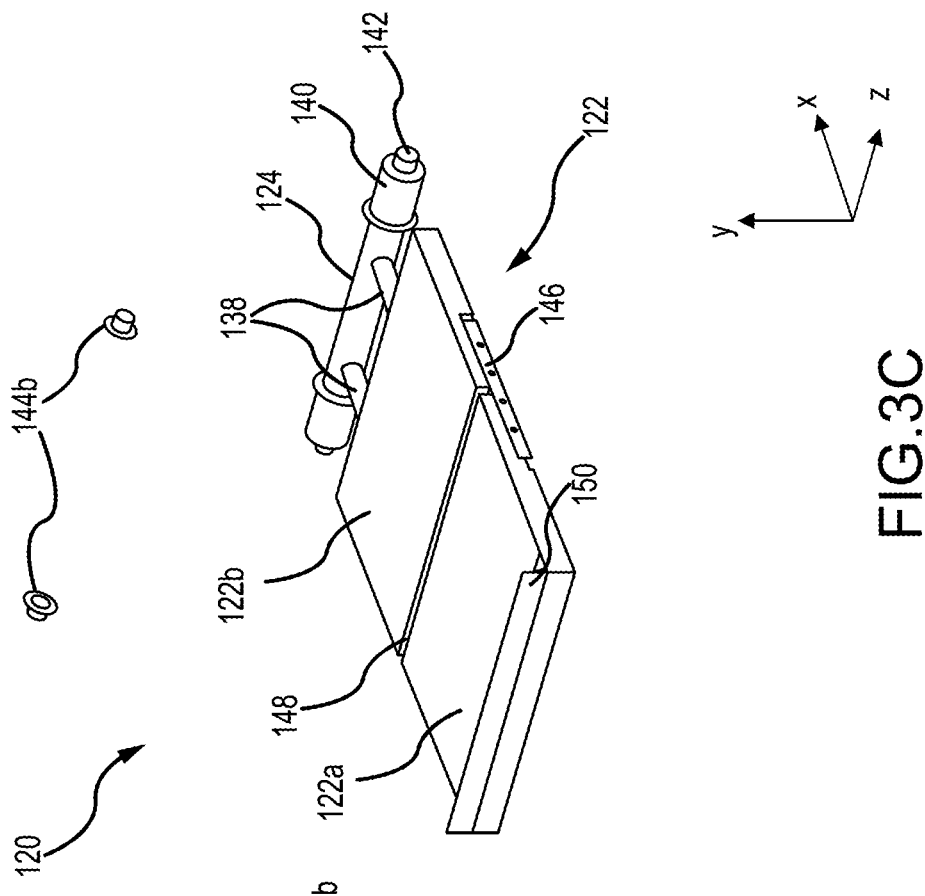
Figure 3B:
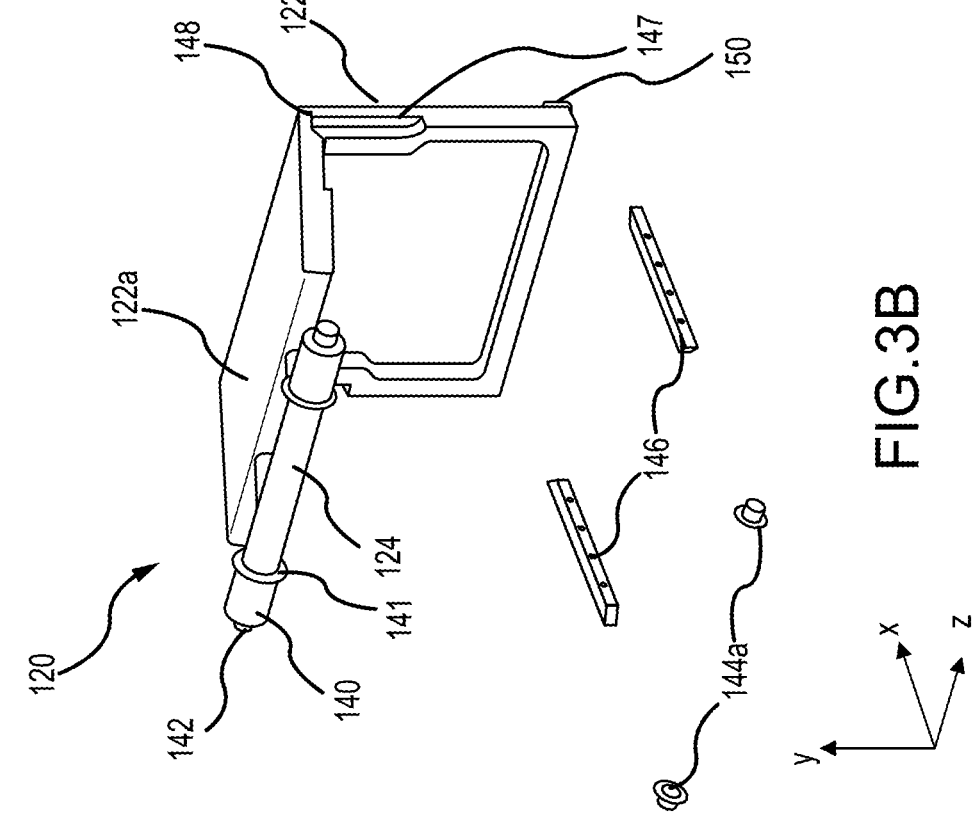

Referring now to FIGS. 3A-3C, in accordance with various embodiments, perspective views of the interior of stowage closet 100 and articulating shelf system 120 are illustrated. An exemplary stowage closet 100 having two sides 100a and 100b, where each side 100a, 100b is accessible by a door at an aisle of an aircraft and are depicted including articulating shelf systems 120a and 120b, support rails 126, and fixed shelf 128. Articulating shelf systems 120a, 120b each include shelf 122, rod 124, rod supports 138, end caps 140, and plungers 142. Rod supports 138, for example two as depicted, connect rod 124 to shelf 122 of articulating shelf system 120. Rod supports 138 are sized to provide structural support while allowing hangers (e.g., clothing 132) to be used with rod 124.

Stowage closet side 100a illustrates articulating shelf system 120a being in a lowered, horizontal position (e.g., the x-axis), as also depicted in FIG. 3C. Stowage closet side 100b illustrates articulating shelf system 120b in a raised position, as also illustrated in FIG. 3B.

Each end of rod 124 further includes an end cap 140. Each end cap 140 includes a flange 141 and plunger 142. Plunger 142 is configured to extend from end cap 140. Flange 141 may be used for manual retraction of end cap 140. End cap 140, including plunger 142, may be biased in the extended position (e.g., the z-axis) by a mechanism located within end cap 140. The mechanism may be a mechanical spring, an electro-mechanical solenoid, a rubber gromet, among others.

Receivers 144 are positioned in the walls of stowage closet 100 (e.g., backside of front panel 102 and backside of back panel 106) and are configured to receive plunger 142. Receivers 144 may be a cup, an indent, a grommet, or other mechanism configured to received and secure plungers 142. A first pair of receivers 144, specifically lower receivers 144a, are positioned to receive plungers 142 when articulating shelf system 120 is in a lowered position and a second pair of receivers 144, specifically upper receivers 144b, are positioned to receive plungers 142 when articulating shelf system 120 is in a raised position. This allows shelf 122 to transition from a locked lowered position, as illustrated in FIG. 3C, to a locked raised position, as illustrated in FIG. 3B.

Shelf 122 includes a first portion 122a and a second portion 122b that are connected by a hinge 148 and in contact with shelf support 146. Shelf 122 may be made from wood, plastic, metal, and/or honeycomb material, among others. In various embodiments, a support recess 147 may be formed in first portion 122a and second portion 122b to make better use of the space with stowage closet 100. Hinge 148 forms a joint between first portion 122a and second portion 122b allowing shelf 122 to articulate, or bend. A second hinge 150 connects the second portion 122b to a vertical support 152, extending in the y-axis, allowing the second portion 122b to rotate from a horizontal position to a vertical position.

When articulating shelf system 120 is in the lowered position, as illustrated in FIG. 3C, shelf 122 including first portion 122a and second portion 122b, is in contact with shelf support 146. More specifically, support recesses 147 of shelf system 120 are in contact with shelf support 146. Additionally, end caps 140, including plungers 142, are extended and locked into lower receivers 144a. The first portion 122a and second portion 122b are horizontal (e.g., the x direction) and in line with each other. Shelf 122 is perpendicular to vertical support 152.

Raising articulating shelf system 120 includes depressing end caps 140 one either side of rod 124 to release plungers 142 from lower receivers 144a. Depressing end caps 140 may be done manually, by pressing a portion of a hand against flange 141 and pulling end caps 140, including plungers 142, toward each other. In various embodiments, rod 124 may include a button, or other mechanism, to depress end caps 140 and/or plungers 142. In various embodiments, movement of rod 124 may cause end caps 140 and/or plungers 142 to depress, thereby releasing them from receivers 144.

After depressing end caps 140, including plungers 142, rod 124, as an example, is lifted upward vertically (e.g., along the y-axis) causing shelf 122 to rotate about hinge 150. While rod 124 is used for description and illustrative purposed, other portions of shelf 122 may be lifted to achieve the same result. At the same time, or separately, rod 124 is pushed backward into the stowage closet 100 (e.g., along the x-axis), causing shelf 122 to articulate about hinge 148. This articulation allows first portion 122a and second portion 122b to rotate with respect to each other about hinge 148. End caps 140, including plungers 142, remain depressed through this motion as they are held in place by sidewalls of stowage closet 100. In various embodiments, end caps 140 may remain depressed in response to a button being pressed.

Shelf 122, specifically rod 124, is maneuvered into position over upper receivers 144b. Once rod 124, and more specifically end caps 140, are located over upper receivers 144b, end cap 140 and plungers 142 extend and lock articulating shelf system 120 into the raised position. In various embodiments, end caps 140 may extend in response to a button being released.

When articulating shelf system 120 is in the raised position, second portion 122b is parallel with vertical support 152 in the y-axis. First portion 122a is rotated with respect to second portion 122b, forming an angle α between first portion 122a and second portion 122b when plungers 142 are locked into upper receivers 144b. In various embodiments, angle α may be about 90° to about 120°, and more specifically, angle α may be about 100° to about 110°. Angle α may be determined to allow sufficient room within stowage closet 100 for hangers (e.g., clothing 132) to be used with rod 124 and allow doors 108 to be closed.

Moving articulating shelf system 120 from the raised position to the lowered position is accomplished by reversing the steps of raising articulating shelf system 120 described above. End caps 140 are depressed to release plungers 142 from upper receivers 144b in a similar manner to that described above. Rod 124, for example, is pulled out of stowage closet 100 (e.g., along the x-axis) and downward (e.g., along the y-axis). This motion causes first portion 122a and second portion 122b to rotate about hinge 148 and become aligned with one another. This alignment may occur prior to achieving the horizontal position (e.g., along the x-axis). Second portion 122b rotates about hinge 150 as it lowers from the vertical position to the horizontal position. Plungers 142 then extend in lower receivers 144a when end caps 140 are located over lower receivers 144a.

Support rails 126 are affixed to interior walls of stowage closet 100 (e.g., backside of front panel 102 and back panel 106). In various embodiments, support rails 126 are further affixed to vertical support 152. As depicted in FIG. 3A, support rails 126 form a U-shape being affixed to vertical support 152 and interior surfaces of front panel 102 and back panel 106. This configuration provides the strength to support some type of stowage (e.g., SUs 134) while leaving an opening to store other types of stowage (e.g., clothing 132 and carry-on luggage 130). This configuration improves the use of stowage closet 100 by supporting multiple different types of stowage. Furthermore, stowage closet 100 is quickly converted to support different types of stowage between different legs of a flight and between different aircraft configurations. In various embodiments, stowage closet 100 further includes a light 154.

Figure 4A:
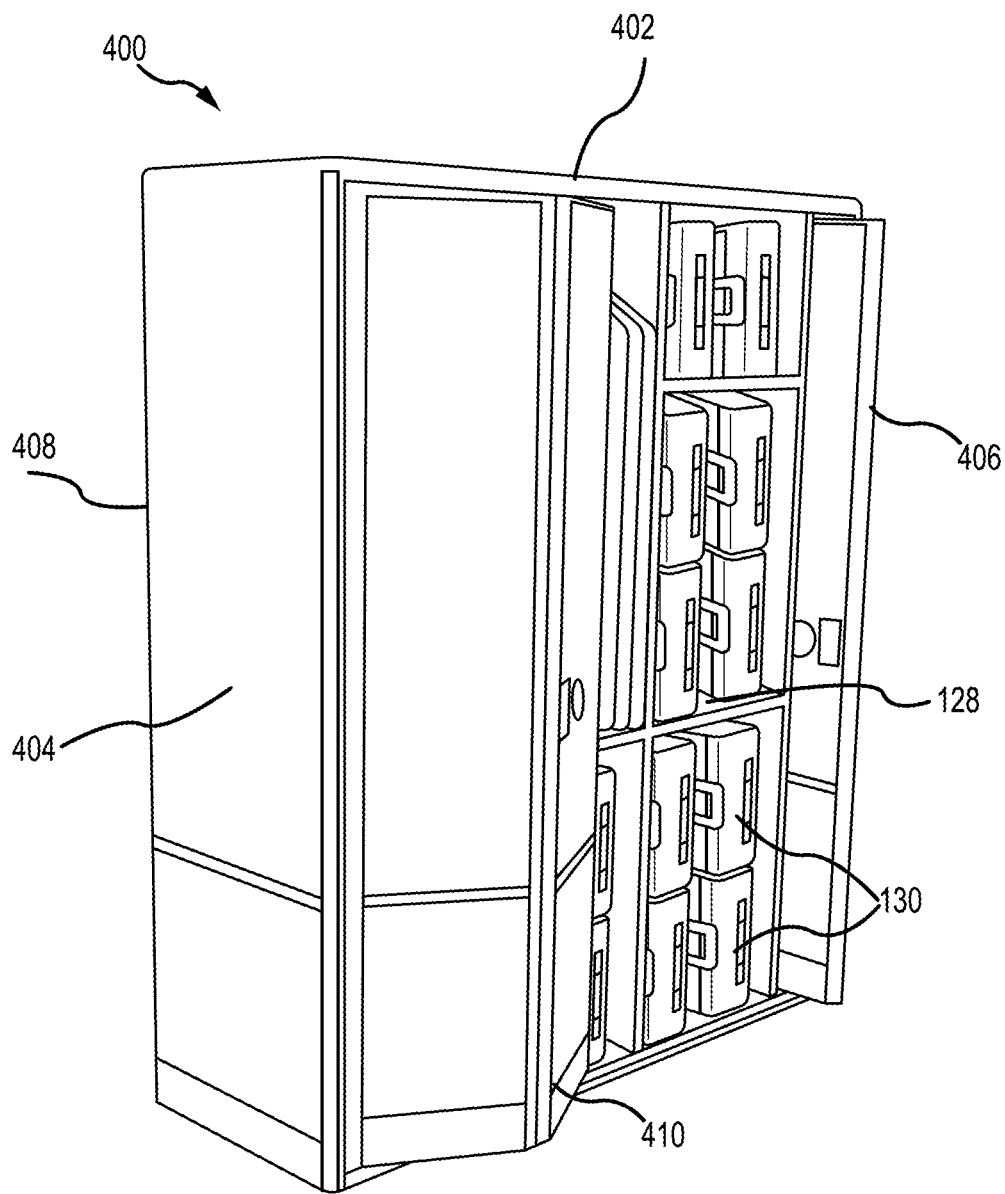
FIGS. 4A and 4B illustrate an exemplary stowage closet, in accordance with various embodiments.
Figure 4B:
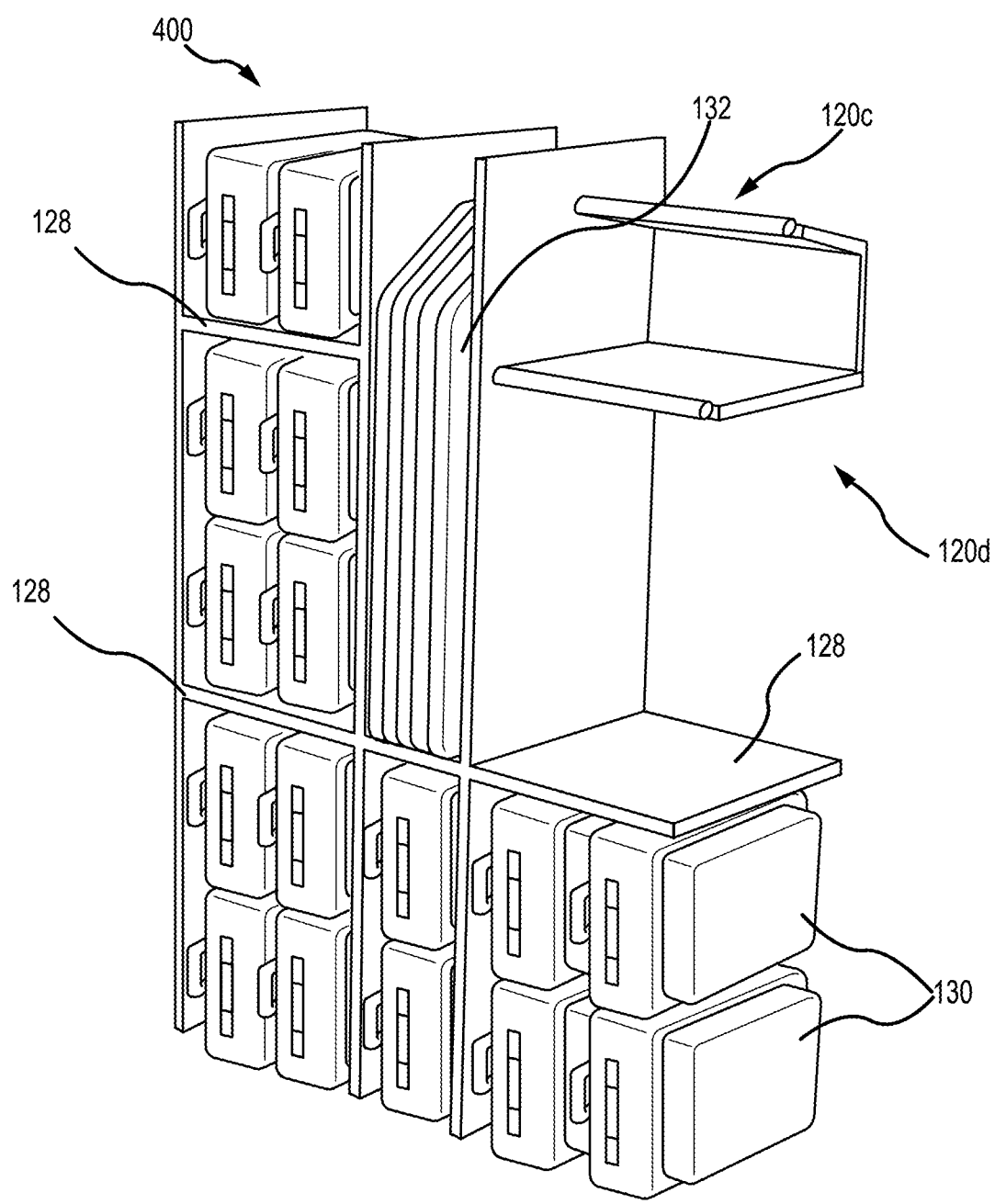

Referring now to FIGS. 4A and 4B, in accordance with various embodiments, an exemplary stowage closet 400 is illustrated. Stowage closet 400 may be placed at the front of an aircraft to provide more storage for carry-on luggage (e.g., carry-on luggage 130). In various embodiments, stowage closet 400 may be placed at any FAA-mandated cross-aisle and/or near any entrance doorway. Stowage closet 400 includes a top panel 402, a first side panel 404, a second side panel 406, a back panel 408, and two bi-fold doors 410. In various embodiments, bi-fold door 410 are configured to slide into stowage closet 400. Stowage closet 400 further includes articulating shelf system 120 and fixed shelves 128. Articulated shelf system 120 is depicted in both a raised position 120c and a lowered position 120d. In various embodiments, upper fixed shelf 128 may be replaced with articulating shelf system 120. As depicted, stowage closet 400 is storing sixteen items of carry-on luggage and a number of items of clothing 132. The depicted configuration of stowage closet 400 is exemplary and other configurations of stowage closet 400 are contemplated.

Stowage closet 100 and stowage closet 400 are discussed with respect to passenger aircraft. Other uses are contemplated. For example, stowage closet 100 and stowage closet 400 may be used in freight aircraft such as separating a courier compartment from the cargo bulkhead of a cargo aircraft. As another example, stowage closet 100 and/or stowage closet 400 may be used on a passenger train for improving luggage storage efficiency.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An articulating shelf, comprising:
   a first shelf portion having a first edge and an opposing second edge;
   a first hinge coupled to the first edge of the first shelf portion;
   a second hinge coupled to the second edge of the first shelf portion;
   a second shelf portion having a first edge and an opposing second edge, the second edge of the second shelf portion coupled to the second hinge;
   a rod having a first end and an opposing second end;
   a rod support having a first end and a second end, the first end of the rod support coupled to the first edge of the second shelf portion and the second end of the rod support coupled to the rod at a point between the first end of the rod and the second end of the rod; and
   an end cap coupled the first end of the rod, the end cap including a plunger configured to extend and retract from the end cap.

2. The articulating shelf of claim 1, further comprising a support coupled to the first hinge.

3. The articulating shelf of claim 2, wherein the support is a vertical wall.

4. The articulating shelf of claim 1, wherein the first hinge is configured to rotate the first shelf portion from a horizontal position and to a vertical position.

5. The articulating shelf of claim 1, further comprising a shelf support configured to support the first shelf portion and the second shelf portion.

6. The articulating shelf of claim 5, wherein the first shelf portion includes a recess configured to receive the shelf support.

7. The articulating shelf of claim 6, wherein the second shelf portion includes a recess configured to receive the shelf support.

8. The articulating shelf of claim 1, wherein the plunger is further configured to lock the rod in a position when extended.

9. The articulating shelf of claim 8, wherein the plunger is further configured to release the rod from the position when retracted.

* * * * *